United States Patent
Kitaguchi et al.

(10) Patent No.: US 7,151,262 B1
(45) Date of Patent: Dec. 19, 2006

(54) RADIOACTIVE GAS MEASUREMENT APPARATUS AND FAILED FUEL DETECTION SYSTEM

(75) Inventors: Hiroshi Kitaguchi, Tokyo (JP); Atsushi Yamagoshi, Tokyo (JP); Shigeru Izumi, Tokyo (JP); Tetsuya Matsui, Tokyo (JP); Akihisa Kaihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/872,449

(22) Filed: Jun. 22, 2004

Related U.S. Application Data (63) Continuation of application No. 10/084,425, filed on Feb. 28, 2002.

(30) Foreign Application Priority Data

Feb. 23, 2000 (JP) .............................. 2000-046190

(51) Int. Cl.
*G01T 1/20* (2006.01)
*G01T 1/24* (2006.01)

(52) U.S. Cl. .............................. 250/370.01
(58) Field of Classification Search ........... 250/370.01, 250/336.1, 339.13, 380, 328, 366, 393, 394, 250/395, 515.1
See application file for complete search history.

(56) References Cited

U.S. PATENT DOCUMENTS

| | | | | |
|---|---|---|---|---|
| 3,617,709 A | * | 11/1971 | Tone | 250/379 |
| 3,767,915 A | * | 10/1973 | Battist | 250/366 |
| 3,988,615 A | * | 10/1976 | Umbarger et al. | 250/253 |
| 4,002,909 A | * | 1/1977 | Packard et al. | 250/328 |
| 4,347,214 A | * | 8/1982 | Sato et al. | 376/251 |
| 5,537,450 A | * | 7/1996 | Asay et al. | 376/253 |
| 5,574,758 A | * | 11/1996 | Murakami et al. | 376/245 |
| 5,866,907 A | * | 2/1999 | Drukier et al. | 250/366 |
| 5,952,655 A | * | 9/1999 | Gross et al. | 250/304 |
| 6,069,362 A | * | 5/2000 | Giakos | 250/394 |
| 6,648,810 B1 | * | 11/2003 | Tenerz et al. | 600/3 |
| 2003/0010924 A1 | * | 1/2003 | El-Hanany et al. | 250/370.09 |

FOREIGN PATENT DOCUMENTS

| | | |
|---|---|---|
| JP | 62-6199 | 1/1987 |
| JP | 03-138593 | 6/1991 |

(Continued)

OTHER PUBLICATIONS

Nakao et al., Activity Report of Radiation Science Center in Fiscal 1998: Shielding experiment at 800 MeV Proton Accelerator Facility, Jul. 1999, pp. 3.*

*Primary Examiner*—David Porta
*Assistant Examiner*—Christine Sung
(74) *Attorney, Agent, or Firm*—Crowell & Moring LLP (57) ABSTRACT

To provide a radioactive gas measurement apparatus that is simply constructed and can efficiently measure Xe-133 in a radioactive gas on-line under the condition that the radioactive gas is mixed with interference N-13, an apparatus is provided for measuring a radiation emitted from Xe-133, including an anticoincidence counter circuit 13 that conducts counting if it receives an output of a main detector 1 when it does not receive outputs of scintillation detectors 2 and 9, and a gate circuit 14, a plate-shaped semiconductor detector is used as the main detector 1, and a material not emitting a characteristic X ray in the range from 70 to 90 keV is used for a shielding structure. In particular, the thickness of the semiconductor detector 1 is set to fall within a range from 2 mm to 7 mm, thereby improving the analysis precision.

4 Claims, 6 Drawing Sheets

FOREIGN PATENT DOCUMENTS

| | | |
|---|---|---|
| JP | 07-218638 | 8/1995 |
| JP | 08015441 A * | 1/1996 |
| JP | 08-220029 | 8/1996 |
| JP | 11-311677 | 11/1999 |
| WO | 94/29745 | 12/1994 |
| WO | 98/47023 | 10/1998 |

* cited by examiner

PRIOR ART

RADIOACTIVE GAS MEASUREMENT APPARATUS AND FAILED FUEL DETECTION SYSTEM

CROSS-REFERENCE TO RELATED APPLICATIONS

This application is a continuation of U.S. patent application Ser. No. 10/084,425, filed Feb. 28, 2002, the entire disclosure of which is incorporated herein by reference. Priority is claimed based on Japanese Patent Application No. 2000-046190, filed Feb. 23, 2000.

BACKGROUND OF THE INVENTION

1. Field of the Invention

The present invention relates to a radioactive gas measurement apparatus for measuring radiation of a radioactive gas and a failed fuel detection system, and in particular, to a radioactive gas measurement apparatus and a failed fuel detection system suitable for measuring Xe-133 emitted when a fuel failure occurs in a reactor.

2. Description of the Prior Art

Detection of a fuel failure in a reactor is accomplished by detecting a radioactive substance in a reactor water or in a gas. In Japanese Patent Laid-Open No. 7-218638, for example, a failed fuel detector that detects the concentration of I-131 in a reactor water is disclosed. This failed fuel detector is configured to measure the concentration of I-131, which is an index for failed fuel detection, by suppressing the effect of a nuclide emitting annihilation gamma rays contained in the reactor water.

Figure 9:
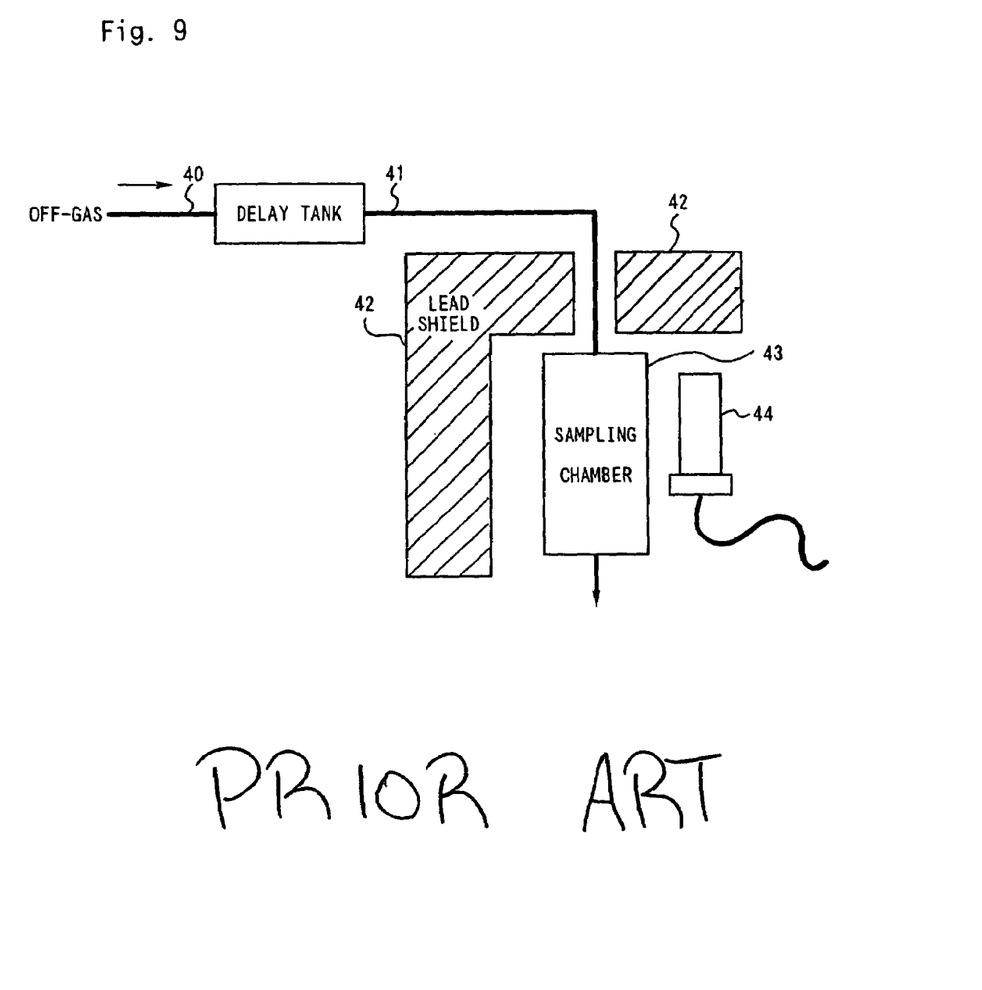
FIG. 9 shows a conventional failed fuel detector.

FIG. 9 shows an example of a conventional failed fuel detector intended to measure radioactive gas. In this conventional failed fuel detector, a delay tank 41 is provided in a discharge pipe 40 for radioactive gas (primarily containing a bleed air in a reactor condensate system and referred to as an off-gas), and a sampling chamber 43 and an ionization chamber detector 44 both enclosed by a lead shield 42 are provided downstream of the delay tank to monitor the radiation intensity level of the radioactive gas. An index for the failed fuel detection is the concentration of Xe-133 in the radioactive gas. The delay tank 41 is provided because nitrogen-13 contained in a gas in quantity (N-13, having a half-life of 10 minutes and produced in a (p, α) reaction of O-16) interferes with the measurement of the index in the radioactive gas, and without a measure against nitrogen, it is difficult to accurately measure the Xe-133 indicative of the fuel failure. Specifically, this is due to the fact that N-13 emits annihilation gamma rays of 511 keV and the low-energy gamma rays (81 keV) of Xe-133 are hidden in the Compton background thereof. Thus, in order to reduce N-13, a residence time of about 1 hour in the delay tank 41 is provided to remove N-13 before measuring the Xe-133 by the radiation level monitor 44 in the ionization chamber.

Furthermore, in Japanese Patent Laid-Open No. 62-6199 ("Off-Gas Monitor"), there is disclosed a method for determining a quantitative value of Xe-133 by detecting the intensity of gamma rays in the off-gas with a NaI detector and a CaTe detector and processing the value with a computer. In addition, in Japanese Patent Laid-Open No. 3-138593 ("Exhaust Gas Radiation Monitoring Apparatus"), there is disclosed a method in which gamma rays are detected after N-13 is removed from an exhaust gas by taking advantage of the fact that the ion thereof is a negative ion.

In order to detect a fuel failure, an index in a reactor water or a gas needs to be measured quickly and precisely. Therefore, failed fuel detection is desirably conducted by monitoring gas, which exhibits the index earlier than a reactor water. However, in the conventional example shown in FIG. 9, measurement is conducted on the gas after passing through the delay tank, so that the failed fuel detection can only be conducted after about 1 hour. In addition, since a level monitor, such as an ionization chamber, is used for measuring radiation, accurate identification (analysis of nuclide) of Xe-133 is impossible. Besides, the technique described in Japanese Patent Laid-Open No. 62-6199 involves an attenuation pipe for attenuating the radioactivity of the radioactive material having a short half-life before measuring gamma rays of a gas, so that the detection is delayed. According to the technique described in Japanese Patent Laid-Open No. 3-138593, a delay in the detection of gamma rays of Xe-133 due to removal of N-13 is avoided, but the size of the apparatus becomes large.

Alternatively, the failed fuel detector intended for a reactor water described in Japanese Patent Laid-Open No. 7-218638 may be applied to a radioactive gas. In such a case, however, there is a large quantity of annihilation gamma rays of 511 keV from N-13 launched into a main detector (detector for measuring Xe-133) and a Compton scattering component, so that the precision of the analysis of Xe-133 is relatively significantly degraded. This is because the energy of the gamma rays emitted from Xe-133 is 81 keV, which is lower than the energy of the gamma rays emitted from I-131, which is the index for the failed fuel detection in terms of reactor water, of 364 keV. In other words, this is because the lower the energy of an index, the more significant the effect of the Compton scattering component is.

SUMMARY OF THE INVENTION

An object of the present invention is to provide a radioactive gas measurement apparatus that can measure a concentration of Xe-133 in a radioactive gas in a short time, with a simple construction, under the condition that the radioactive gas is mixed with interference N-13.

According to the present invention, there is provided a radioactive gas measurement apparatus, comprising: a radiation detection system having a main detector and a sub-detector that are arranged at positions diametrically opposed to each other with respect to a sampling chamber, into or out of which a radioactive gas flows, and a shield for shielding a background radiation surrounding the detectors; and an anticoincidence counter circuit in a measuring circuit, in which a particular radiation emitted from the radioactive gas is measured with an anticoincidence count processing using signals of both the detectors, characterized in that the main detector is a plate-shaped semiconductor detector having a thickness less than a diameter of a surface thereof orthogonal to the thickness direction.

Furthermore, according to the present invention, there is provided a radioactive gas measurement apparatus, comprising: a main detector and a first sub-detector having the shape of a well and surrounding the main detector that are arranged at one of two positions diametrically opposed to each other with respect to a sampling chamber, into or out of which a radioactive gas flows; a second sub-detector arranged at the other of the two positions; and an anticoincidence counter circuit as a measuring circuit, in which a particular radiation emitted from the radioactive gas is measured with an anticoincidence count processing using signals of the main detector and two sub-detectors, characterized in that the main detector is a detector made from a plate-shaped semiconductor having a thickness less than a diameter of a surface thereof orthogonal to the thickness direction.

Furthermore, according to the present invention, in the above-described radioactive gas measurement apparatus, the thickness of the plate-shaped semiconductor detector is between 2 mm and 7 mm.

Furthermore, according to the present invention, in the above-described radioactive gas measurement apparatus, the shield for shielding the background radiation is made of a material that does not emit a characteristic X ray within a range of energy from 70 to 90 keV inclusive.

Furthermore, according to the present invention, there is provided a failed fuel detection system, characterized in that radiation intensity emitted from Xe-133 contained in an off-gas in a reactor condensate system is measured by the above-described radioactive gas measurement apparatus, the measurement values are collected on the time series, and the resulting time-series data is analyzed to detect a fuel failure in a reactor.

DETAILED DESCRIPTION OF THE PREFERRED EMBODIMENTS

Figure 1:
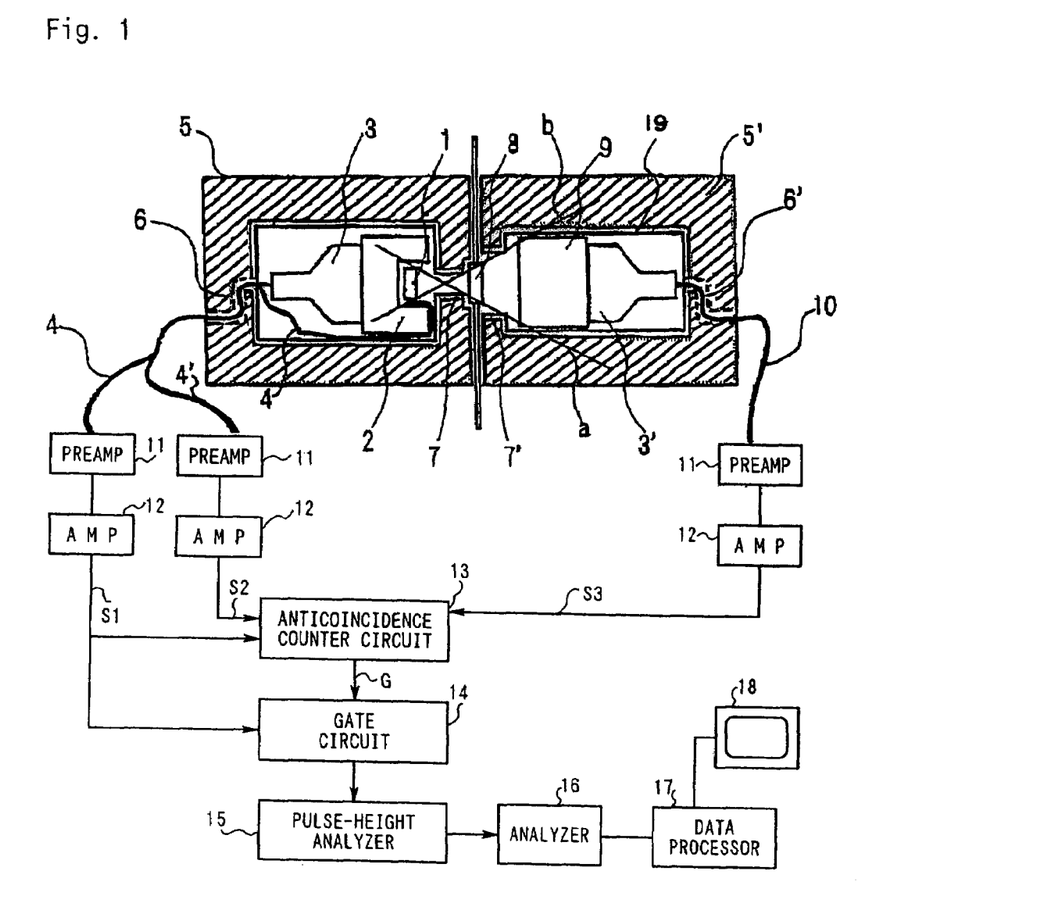
FIG. 1 shows a construction of a radioactive gas measurement apparatus according to this invention.

An embodiment of the present invention will be described below with reference to the drawings. FIG. 1 shows a construction of a radioactive gas measurement apparatus according to this invention, in which a plate-shaped main detector (a semiconductor detector) 1 for detecting Xe-133 is provided in a well-type NaI (Tl) scintillation detector 2 for anticoincidence counting. A signal line 4 of the main detector 1 and a signal line 4' of the scintillation detector 2 (an output of a photomultiplier tube 3) are drawn out via a bent hole 6 formed in a rear portion of a lead shield 5. The bent hole 6 is intended to prevent background radiation from entering from the outside. A sampling chamber 8, into or out of which the radioactive gas to be measured flows, is disposed in front of the main detector 1 via a collimator 7 of the shield 5. At a position 180 degrees opposite to the scintillation detector 2 with respect to the sampling chamber 8, another scintillation detector 9 including a photomultiplier tube 3' is provided via a collimator 7' of a similar shield 5'. As in the case of the side of the main detector 1, a signal line 10 is drawn out via a bent hole 6'.

The collimator 7 of the main detector 1 and the collimator 7' on the side of the scintillation detector 9 are provided within the range allowing for the sampling chamber 8 (within the range of angle defined by lines a and b in FIG. 1). This arrangement is intended to prevent the annihilation gamma rays (511 keV) emitted from N-13 in the sampling chamber one in each of the direction 180 degrees opposite to each other from being detected by only one of the main detector 1 and the scintillation detector (sub-detector) 9 so that they are always detected by both the detectors when they are detected. This arrangement is realized by adjustment of the depth or aperture of the collimators 7'.

Next, a construction of a signal processing circuit will be described. Each of the output signal lines 4, 4' and 10 of the main detector 1, the scintillation detector 2 and the opposing scintillation detector 9, respectively, has a preamplifier 11 and a linear amplifier 12, and is connected to an anticoincidence counter circuit 13 downstream of the amplifiers. In addition, the output of the amplifier 12 in the signal line 4 of the main detector 1 branches off from the line leading to the anticoincidence counter circuit 13 and connected to a gate circuit 14. The anticoincidence counter circuit 13 outputs a gate signal G to the gate circuit 14 if both of signals S2 and S3 obtained by amplifying the outputs of the scintillation detectors 2 and 9, respectively, don't exist when the circuit is synchronized with a signal S1 obtained by amplifying the output of the main detector 1. The gate circuit 14 inputs the input signal S1 to a pulse-height analyzer 15 only when it receives the gate signal G. Based on the result of the pulse-height analysis by the analyzer 15, an analyzer 16 identifies Xe-133, and then a fuel failure determination apparatus consisting of a data processor 17 and a display 18 determines the presence of a fuel failure and displays the result. The detection level of the fuel failure is determined according to the value of the statistical error σ (square root of the actual count value) of the count value of Xe-133 under the condition of no fuel failure. That is, the detection is based on whether the count value of Xe-133 is higher than the statistical error σ or not. Alternatively, the criterion may be 2σ or 3σ. As for the selection of the criterion kσ, a small constant k is selected when the sensitivity of the failure determination is to be increased, and a large constant k is selected when the precision of the failure determination is to be increased.

Figure 2:
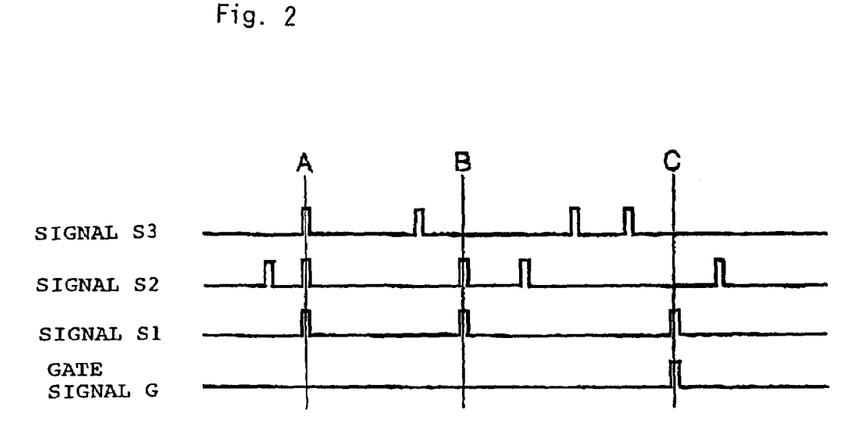
FIG. 2 is a time chart of measurement of Xe-133.

FIG. 2 is a time chart showing an example of the above-described measurement of Xe-133. At time A, the main detector 1 and other detectors 2, 9 simultaneously detect gamma rays, and the gate signal G is not output. Similarly, at time B, the detection signal S2 of the detector 2 is detected in synchronization with the detection signal S1 of the main detector 1, so that the gate signal G is not output. At time C, the signals of the detectors 2 and 9 are not detected in synchronization with the detection signal S1 of the main detector 1, and the gate signal G is output. In this way, Xe-133 is measured by taking advantage of Compton suppression (removal of Compton scattered rays) including annihilation gamma rays. This measurement allows the annihilation gamma rays of N-13 discharged from the sampling chamber, or Compton components of the annihilation gamma rays and other gamma rays to be eliminated, so that only the gamma rays solely launched into the main detector 1 can be efficiently measured without the need to physically remove components such as N-13.

Figure 3:
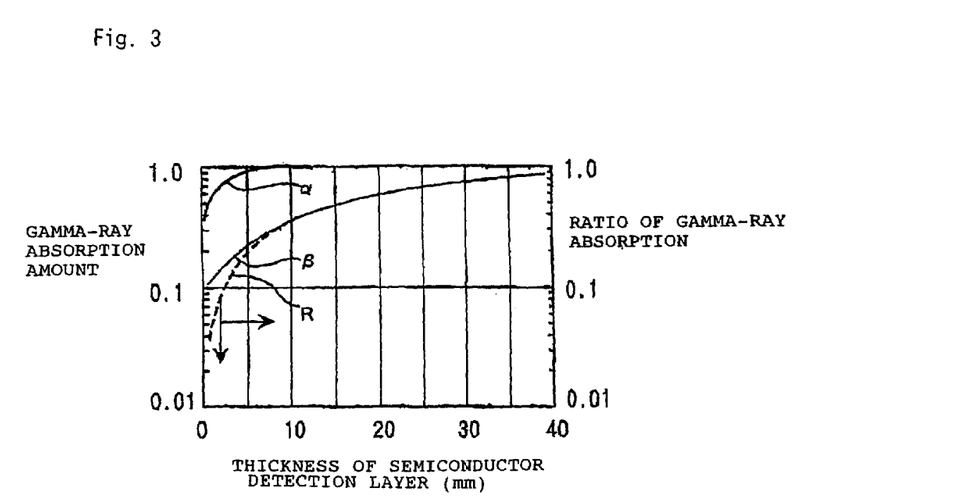
FIG. 3 is a graph showing a relationship between a thickness of a detection layer and an absorption amount of gamma rays in a main detector.

FIG. 3 shows a relationship between a thickness of a detection layer and an absorption amount of gamma rays (detection sensitivity) in the main detector 1 for cases where the energy of the gamma rays is 81 keV (Xe-133) and 511 keV (N-13), in which the material of the detector is germanium. As for the absorption amount α of gamma rays of 81 keV, the sensitivity becomes saturated when the detector thickness is on the order of 5 mm. That is, even if the thickness of the detector is further increased, the sensitivity cannot be further increased. As for the absorption amount β of gamma rays of 511 keV, the sensitivity continues to be increased even after the detector thickness exceeds 40 mm. However, each of the absorption amounts α and β represents a value scaled according to the saturation value thereof, which corresponds to the detection efficiency. In addition, the scale shown on the right in FIG. 3 shows an absorption ratio R of gamma rays (511 keV/81 keV). From this relationship, it can be seen that a thinner detector results in a lower absorption ratio R, so that it is more advantageous for the measurement of the gamma rays of 81 keV.

Next, the degree to which the thickness of the detector can be reduced will be described. On the assumption that reference character Np denotes the intensity (concentration) of the gamma rays of 81 keV from Xe-133 in a measurement region, reference character Nb denotes the background intensity (primarily containing Compton tails of annihilation gamma rays (511 keV) from N-13), and the main detector 1 has the characteristics shown in FIG. 3, the analysis error Δ of a gamma rays spectrum in a pulse-height analysis is represented by:

$$\Delta = (\alpha \cdot N_p + 2\beta \cdot N_b)^{1/2} / (\alpha \cdot N_p) \quad \text{[Formula 1]}$$

Here, if an amount ζ equivalent to the reciprocal of the signal-to-noise ratio is defined as:

$$\zeta = N_b / N_p \quad \text{[Formula 2]}$$

then the analysis error Δ is given by:

$$\Delta = (\alpha \cdot N_p + 2\beta \cdot \zeta \cdot N_b)^{1/2} / (\alpha \cdot N_p) \quad \text{[Formula 3]}$$

Figure 4:
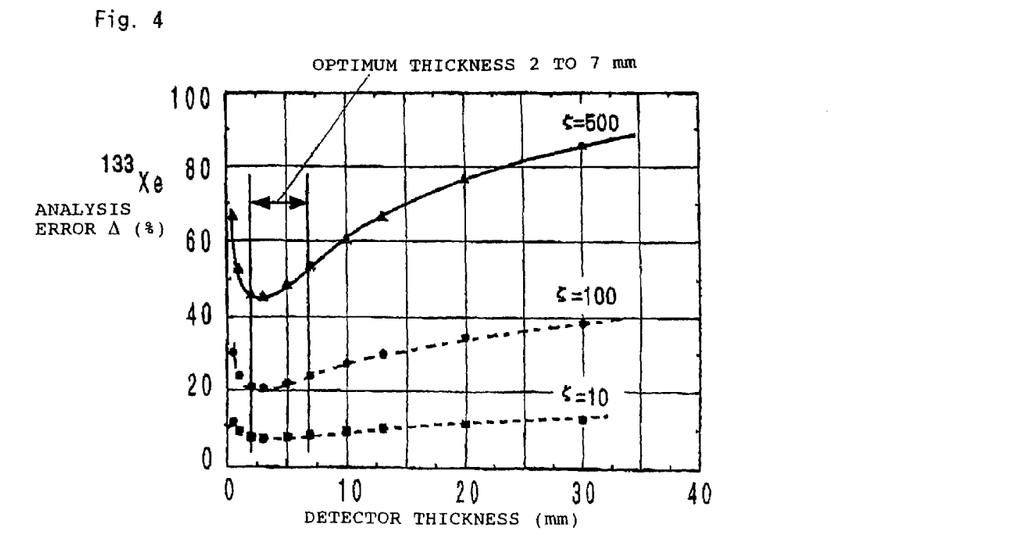
FIG. 4 is a graph showing a relationship between a thickness of a detector and an analysis error of Xe-133.

FIG. 4 shows the analysis error Δ calculated from Formula 3 using ζ as a parameter, after determining the detection efficiencies α and β of the germanium semiconductor detector on the assumption that the value Np is fixed and the detector thickness is variable.

From this drawing, the optimum range of the detector thickness is from 2 mm to 7 mm. When the thickness is less than 2 mm, the detection efficiency of Xe-133 itself is extremely reduced, so that the measurement time needs to be extended in order to maintain the level of analysis precision. In addition, it can be seen that, in this relationship, when the concentration of N-13, which is defined as the background noise here, is increased so that the value of ζ is increased, the effect thereof becomes remarkable. Furthermore, it can be seen that the ratio of N-13 to Xe-133 contained in the off-gas may be equal to or higher than 1000 (ζ=1000), and a plate-shaped detector having a thickness within the range from 2 mm to 7 mm is most preferably used as the main detector 1 of this invention. In addition, even if the detector thickness is on the order of 30 mm, increasing the S/N enables the analysis precision to be improved compared with a conventional detector having greater thickness. In this regard, the "plate-shaped detector" herein refers to a detector having a ratio (t/L) between the thickness t and a value L (diameter in the case of a circular detector, or length of a diagonal line in the case of a rectangular detector) is equal to or less than 1.

Figure 5:
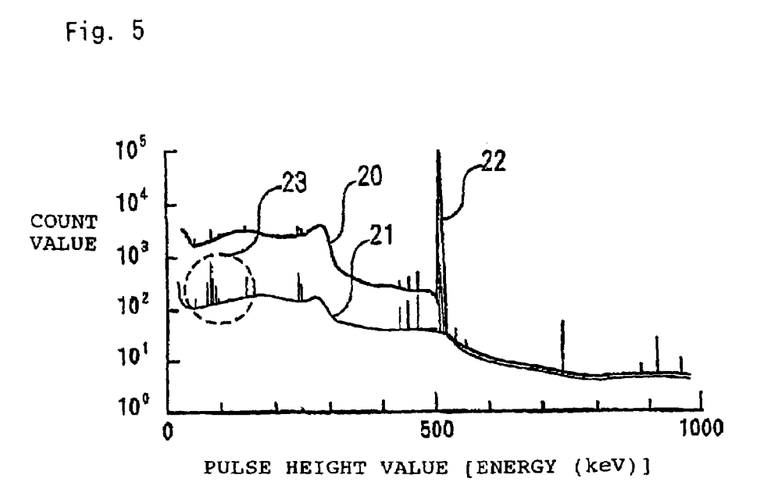
FIG. 5 shows an example of a gamma-ray spectrum of a radioactive gas measured by the apparatus shown in FIG. 1.

FIG. 5 shows an example of a gamma-ray spectrum of a radioactive gas measured by the apparatus according to this invention. FIG. 5 shows an untreated spectrum 20 obtained by the main detector 1, and a spectrum 21 obtained by subjecting the scintillation detectors 2 and 9 to the Compton suppression. In the spectrum 21, the annihilation gamma rays 22 from N-13 is reduced, the Compton component 23 in the Xe-133 detection region 23 (energy range from 70 to 90 keV) is reduced by one or more order of magnitude, and thus the spectrum including Xe-133 (81 keV) is distinguished, which indicates that the measurement error of Xe-133 is improved by a factor of 3 or more.

The spectrum analysis of low-energy gamma rays (81 keV) from Xe-133 is seriously affected by the characteristic X ray, as well as the Compton component. In particular, the lead shield typically used emits the characteristic X rays of Kα (75 keV), Kα2 (72.8 keV), Kβ1 (84.9 keV), and Kβ2 (87.3 keV), which seriously affect the analysis of Xe-133 (81 keV). Therefore, the apparatus for measuring a radioactive gas advantageously includes a shield made of a material that does not emit the characteristic X ray in the Xe-133 detection region such as iron, copper, or stainless steel, or has a lining (denoted by reference numeral 19 in FIG. 1) made of such a material. For example, if the material is iron, the thickness of the lining is preferably equal to or more than 5 mm.

Figure 6:
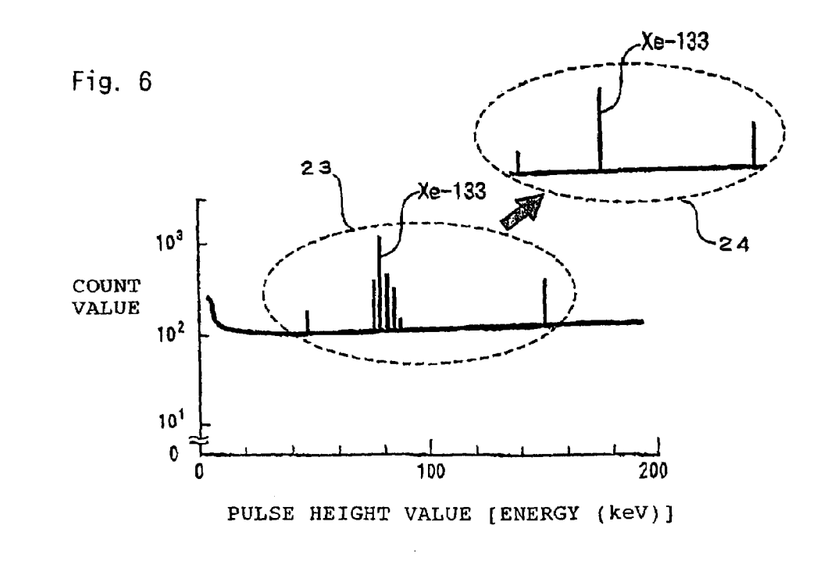
FIG. 6 shows an enlarged spectrum for a Xe-133 detection region.

FIG. 6 shows an enlarged spectrum for the Xe-133 detection region 23 in FIG. 5. The spectrum in the region 23 in FIG. 5 includes both the characteristic X ray from the lead shield and the gamma rays of 81 keV from Xe-133. Eliminating the characteristic X ray by the above-described shield results in the spectrum 24, which is obviously different from the spectrum in the region 23. In this way, the analysis precision and sensitivity of Xe-133 can be improved by one or more order of magnitude. This has the effect of significantly improving the performance of the failed fuel detection based on the detection of Xe-133 as an index. In addition, since the failed fuel detection apparatus includes node lay tank for attenuating N-13, it is excellent as an on-line apparatus.

Figure 7:
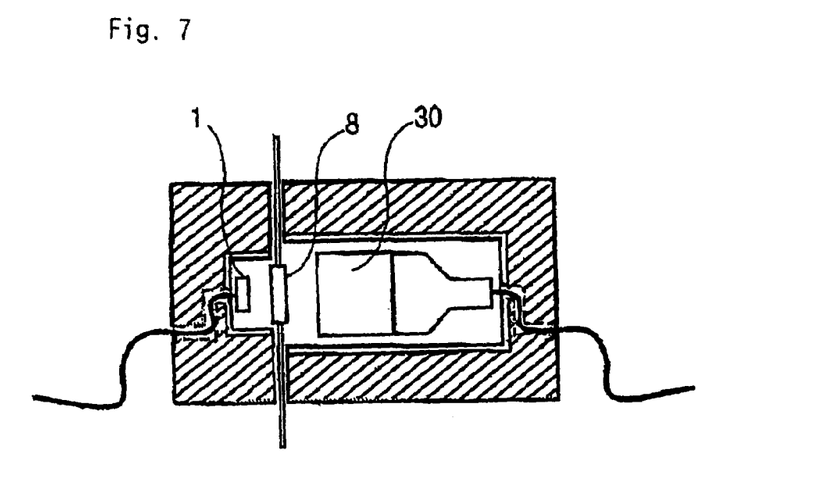
FIG. 7 shows a modification of the apparatus according to this invention.

FIG. 7 shows a modification of the apparatus according to this invention, which has a simple construction in which only the scintillation detector 30 is provided at a position opposed to the main detector 1 with respect to the sampling chamber 8 for the radioactive gas. With this construction, the detection sensitivity of Xe-133 is somewhat sacrificed. However, since unlike the apparatus in FIG. 1, the well-type scintillation detector 2 surrounding the main detector 1 is not provided, the whole detection section including the shielding structure can be downsized.

Figure 8:
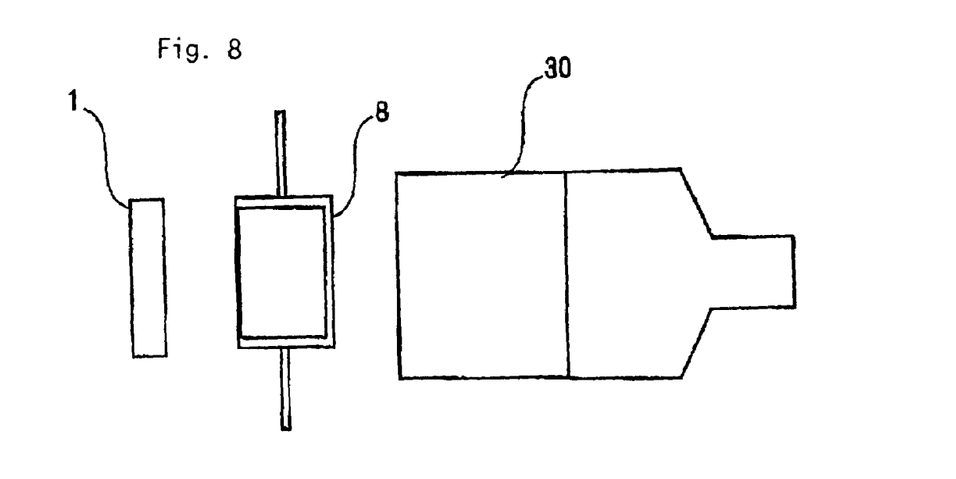
FIG. 8 shows a construction of a radioactive gas sampling chamber.

FIG. 8 shows a construction of a radioactive gas sampling chamber. In a suitable construction, the sampling chamber 8 comprises a thin detection window intended to efficiently detect the low energy gamma rays from Xe-133 on the side of the main detector 1. If the detection window is made of iron or stainless steel, the thickness thereof is desirably on the order of 0.5 mm.

While in the above description, the Ge semiconductor detector is used for the main detector, it may be replaced with various semiconductor detectors such as those made of CdTe, CZT, or GaAs. Furthermore, besides NaI (Tl), the scintillation detectors 2 and 9 for anticoincidence count processing may have a construction including various scintillators such as a plastic scintillator, BGO, or CsI. Also, a construction including a semiconductor detector made of Ge or the like as the detector for anticoincidence count processing provides the same effect. A fuel failure can be detected with reliability at an early stage by using the radiation detection apparatus thus constructed to measure the concentration of Xe-133 in the off-gas in the reactor condense system, collecting the time-series data thereof, and monitoring the collected data.

According to the present invention, a radioactive gas measurement apparatus with a high performance that can efficiently measure Xe-133 (81 keV) in a radioactive gas containing N-13 with a simple construction can be provided.

What is claimed is:

1. A radioactive gas measurement apparatus for measuring radiation of radioactive gas, comprising:
   a main detector and a sub-detector that are arranged at positions diametrically opposed to each other with respect to a sampling chamber, into or out of which a radioactive gas flows, and
   a shield for shielding a background radiation surrounding the detectors, wherein said shield defines first and second collimators, said first collimator adapted to collimate radiation emitted from a gas in the sampling chamber toward the main detector, and said second collimator adapted to collimate radiation emitted from a gas in the sampling chamber toward the sub-detector, and said shield is made of a material that does not allow penetration of a characteristic X ray within a range of energy from 70 to 90 keV inclusive;
   wherein the main detector is a detector made from a plate-shaped semiconductor detector having a thickness of between 2 mm and 7 mm, the sub-detector is a scintillation detector, wherein a thickness of the scintillation detector is thicker than that of the semiconductor detector, and wherein the radiation of the radioactive gas is measured by processing both signal of the plate-shaped semiconductor detector and the scintillation detector.

2. A failed fuel detection system, wherein radiation intensity emitted from Xe-133 contained in an off-gas in a reactor condensate system is measured by a radioactive gas measurement apparatus according to claim 1, the measurement values are collected on a time series, and the resulting time-series data are analyzed to detect a fuel failure in a reactor.

3. A radioactive gas measurement apparatus, comprising:
   a main detector made from a plate-shaped semiconductor detector,
   a first sub-detector having the shape of a well and surrounding the main detector, wherein the main detector and the first sub-detector are arranged at one of two positions diametrically opposed to each other with respect to a sampling chamber, into or out of which a radioactive gas flows;
   a second sub-detector arranged at the other of the two positions; and
   a shield for shielding a background radiation surrounding the detectors, wherein said shield defines first and second collimators, said first collimator adapted to collimate radiation emitted from a gas in the sampling chamber toward the main detector, and said second collimator adapted to collimate radiation emitted from a gas in the sampling chamber toward the second sub-detector, and said shield is made of iron and is 5 mm or more in thickness;
   wherein the first and second sub-detectors are scintillation detector and the main detector is a detector made from a plate-shaped semiconductor having a t/L ratio of 1 or less and a thickness of between 2 mm and 7 mm, and wherein the radiation of the radioactive gas is measured by processing signal of the main detector and both sub-detectors.

4. A failed fuel detection system, wherein radiation intensity emitted from Xe-133 contained in an off-gas in a reactor condensate system is measured by a radioactive gas measurement apparatus according to claim 3, the measurement values are collected on a time series, and the resulting time-series data is analyzed to detect a fuel failure in a reactor.

* * * * *